(12) United States Patent
Shin et al.

(10) Patent No.: US 7,212,667 B1
(45) Date of Patent: May 1, 2007

(54) COLOR IMAGE PROCESSING METHOD FOR INDEXING AN IMAGE USING A LATTICE STRUCTURE

(75) Inventors: Hyun-doo Shin, Sungnam (KR); Yang-lim Choi, Kyungki-do (KR); Yining Deng, Santa Barbara, CA (US); Bangalore S. Manjunath, Santa Barbara, CA (US)

(73) Assignees: Samsung Electronics Co., Ltd., Kyungki-do (KR); University of Calif. at Santa Barbara, Oakland, CA (US)

( * ) Notice: Subject to any disclaimer, the term of this patent is extended or adjusted under 35 U.S.C. 154(b) by 0 days.

(21) Appl. No.: 09/562,077

(22) Filed: May 1, 2000

Related U.S. Application Data

(60) Provisional application No. 60/134,550, filed on May 17, 1999.

(51) Int. Cl.
*G06K 9/00* (2006.01)

(52) U.S. Cl. .................................... 382/165; 382/305

(58) Field of Classification Search ........ 382/162–167, 382/305, 190, 173; 707/1–104.1; 715/700, 715/723
See application file for complete search history.

(56) References Cited

U.S. PATENT DOCUMENTS

| | | | | |
|---|---|---|---|---|
| 5,325,297 | A | | 6/1994 | Bird et al. ............. 364/419.07 |
| 5,586,197 | A | * | 12/1996 | Tsujimura et al. .......... 382/162 |
| 6,373,979 | B1 | * | 4/2002 | Wang ..................... 382/165 |
| 6,516,100 | B1 | * | 2/2003 | Qian ..................... 382/305 |
| 6,519,360 | B1 | * | 2/2003 | Tanaka ..................... 707/3 |
| 6,721,447 | B1 | * | 4/2004 | Kim et al. ................. 382/162 |
| 6,778,697 | B1 | * | 8/2004 | Shin et al. ................ 382/164 |
| 6,801,657 | B1 | * | 10/2004 | Cieplinski ................. 382/164 |
| 6,853,746 | B2 | * | 2/2005 | Shin et al. ................ 382/164 |
| 7,027,644 | B1 | * | 4/2006 | Kim et al. ................. 382/165 |

FOREIGN PATENT DOCUMENTS

| | | |
|---|---|---|
| JP | 62-032569 | 2/1987 |
| JP | 04-257984 | 9/1992 |
| JP | 5-274372 | 10/1993 |
| JP | 8-16789 | 1/1996 |
| JP | 08-022532 | 1/1996 |
| JP | 08-272345 | 10/1996 |
| JP | 09-138804 A | 5/1997 |
| JP | 9-298747 | 11/1997 |

(Continued)

OTHER PUBLICATIONS

Deng et al. "An efficient low-dimensional color indexing scheme for region-based image retrieval" Proc. of ICASSP 1999, vol. 6 pp. 3017-3020, Mar. 1999.*

(Continued)

*Primary Examiner*—Ishrat Sherali
(74) *Attorney, Agent, or Firm*—Sughrue Mion, PLLC

(57) ABSTRACT

A color image processing method is provided. The color image processing method includes the step of: (a) indexing a color image by assigning representative colors of an image to a color space divided into a plurality of regions. The color image processing method may be applied to object-based image processing such as MPEG-7, and fast search and retrieval of multimedia content can be made.

15 Claims, 4 Drawing Sheets

FOREIGN PATENT DOCUMENTS

JP          11-96364          4/1999

OTHER PUBLICATIONS

Chua et al. "Fast signature-based color-spatial image retrieval" Proc. in International Conference on Multimedia Computing and Systems'97, pp. 362-369, Jun. 1997.*

Hsu et al., An integrated Color -Spatial Approach to Content-based I mage Retrieval, ACM Multimedia 95-Electronic Proceeding p. 1-15.*

ITE Technical Reports dated Feb. 3, 1997, vol. 21, No. 6, pp. 45-52.

Eiji Okano, et al. "An Image Retrieval Method by a Rough Sketch", Techinical Report of Ieice, Jan. 1994, pp. 53-60.

* cited by examiner

FIG. 4

| $n_1$ | $n_2$ | $n_3$ | ....... | $n_{k-1}$ | $n_k$ |
|---|---|---|---|---|---|
| $ID_1, C_1, P_1$ | . | $ID_3, C_3, P_3$ | . | $ID_2, C_2, P_2$ | . |
| ⋮ | ⋮ | ⋮ | ⋮ | ⋮ | ⋮ |

COLOR IMAGE PROCESSING METHOD FOR INDEXING AN IMAGE USING A LATTICE STRUCTURE

BACKGROUND OF THE INVENTION

This is a non-provisional application based on provisional application 60/134,550 filed on May 17, 1999.

1. Field of the Invention

The present invention relates to a color image processing method, and more particularly, to a method for indexing a color image so that searching for a color image can be efficiently performed.

The present invention also includes a color image searching method for searching an image corresponding to a query image in a database indexed by the color image processing method.

2. Description of the Related Art

According to conventional color image processing methods, one color is expressed as one vector in a three-dimensional (hereinafter referred to as a 3-D) color space composed of three axes ranging from 0 to 255. Thus, each pixel in an image is expressed as one of 256×256×256 values. That is, a database must have 256×256×256 storage places so as to store a color feature vector of the image in the database. Also, in a matching process, searching of 256×256×256 values may have to be performed. Thus, according to the conventional color image processing methods, a large capacity database is required, and it takes much time to search a desired image from the database.

SUMMARY OF THE INVENTION

To solve the above problems, it is an object of the present invention to provide a color image processing method capable of indexing a color image and fast search and retrieval of a desired image by using a small capacity database.

It is another object of the present invention to provide a medium for storing a program performing the color image processing method.

It is still another object of the present invention is to provide a color image searching method for searching a desired image in the color image indexed according to the color image processing method.

It is yet still another object of the present invention is to provide a medium for storing a program performing the color image searching method.

Accordingly, to achieve the above objectives, according to one aspect of the present invention, there is provided a color image processing method. The color image processing method comprises the step of (a) indexing a color image by assigning representative colors of an image to a color space divided into a plurality of regions.

It is preferable that the color image processing method further comprises the step of (pa-1) obtaining the representative colors of the image and their ratio.

It is also preferable that the ratio is a percentage.

Preferably, the color image processing method further comprises the step of (b) storing a region identifier expressing the representative colors, their ratio, and serial numbers of an image and a region in a database as data.

Preferably, the image is one region selected from divided regions.

Also, the color space is preferably a 3-D color space.

In order to achieve the above objects, according to another aspect of the present invention, there is provided a color image processing method. The color image processing method comprises the steps of: (a-1) obtaining a feature vector F expressed as an i-th representative color $c_i$ and as its ratio $p_i$ when N is the number of representative colors in the divided regions of an image, and i is an integer between 1 and N: $F=\{\{c_i,p_i\},i=1,\ldots,N\}$; (a-2) indexing the image by assigning the representative colors to lattice points of a color space having a lattice structure; and (a-3) storing indexed results in a database having the form of a separate table.

In order to achieve another object, there is provided a medium for storing a program performing a color image processing method for indexing an image, said medium including computer readable program code means for: (a-1) obtaining a feature vector F expressed as an i-th representative color $c_i$ and as its percentage $p_i$ when N is the number of representative colors in the divided regions of an image, and i is an integer between 1 and N: $F=\{\{c_i,p_i\},i=1,\ldots,N\}$; (a-2) indexing the image by assigning the representative colors to lattice points of a 3-D color space divided into a plurality of regions; and (a-3) storing indexed results in a database having the form of a separate table.

In order to achieve still another object, according to one aspect of the present invention, there is provided a color image searching method for searching an image in a database based on a color feature of a query image. The color image searching method comprises the step of (a) performing a search based on representative colors of a query image and their ratio in the database indexed by assigning the representative colors of a database image to a color space divided into a plurality of regions.

The color space is preferably a 3-D color space.

It is preferable that the step (a) comprises the steps of: (a-1) obtaining representative colors of a given query image and their ratio; (a-2) selecting a region corresponding to the representative colors obtained in the step (a-1) in a color space divided into a plurality of regions; (a-3) selecting a data group indexed into the region selected from a database; and (a-4) identifying matched data in which the difference in the ratio of the representative color of the query image is less than a predetermined threshold value in the selected data group.

It is also preferable that the step (a) further comprises the steps of: (a-5) obtaining the sum of the ratio of same regions from the identified data; and (a-6) determining the region in which the difference between the sum of the obtained ratio and the sum of the ratio to the query image is less than a predetermined threshold value as a searched image.

Preferably, the color image searching method further comprises the step of performing the steps in the color space with respect to neighboring peripheral regions in the case where there are no regions determined as the searched image.

Preferably, the query image is one region of the image divided into a plurality of regions, and the searched image is one region of the database image divided into a plurality of regions.

In order to achieve still another object, according to another aspect of the present invention, there is provided a color image searching method for searching an image in the database based on a color feature of a query image. The color image searching method comprises the steps of: (a-1) obtaining representative colors of given query regions and their ratio; (a-2) selecting a lattice point corresponding to the representative color obtained in the step (a-1) in a 3-D color space divided into a plurality of lattices; (a-3) selecting a data group corresponding to the lattice point selected from the database in which a region identifier expressing representative colors of data images, their ratio, and serial numbers of an image and a region is stored as data; (a-4) identifying matched data in which a difference in the ratio of the representative color of the query regions is less than a predetermined threshold value in the selected data group; (a-5) obtaining the sum of the ratio of same regions from the identified data; and (a-6) determining the regions in which the difference between the sum of the obtained percentages and the sum of the ratio of the query regions is less than a predetermined threshold value as a searched image.

In order to achieve yet still another object, there is provided a medium for storing a program performing a color image searching method, said medium including computer-readable code means for: (a-1) obtaining representative colors of given query regions and their ratio; (a-2) selecting a lattice point corresponding to the representative colors obtained in the step (a-1) in a 3-D color space divided into a plurality of lattices; (a-3) selecting a data group corresponding to the lattice point selected from the database in which a region identifier expressing representative colors of data images, their ratio, and serial numbers of an image and a region is stored as data; (a-4) identifying matched data in which the difference in the ratio of the representative color of the query regions is less than a predetermined threshold value in the selected data group; (a-5) obtaining the sum of the ratio of same regions from the identified data; and (a-6) determining the regions in which the difference between the sum of the obtained percentages and the sum of the ratio of the query regions is less than a predetermined threshold value as a searched image.

BRIEF DESCRIPTION OF THE DRAWINGS

The above objects and advantages of the present invention will become more apparent by describing in detail a preferred embodiment thereof with reference to the attached drawings in which:

FIG. 4 illustrates a database having the form of a separate table used for the color image processing method of FIG. 1.

DETAILED DESCRIPTION OF THE INVENTION

Figure 1:
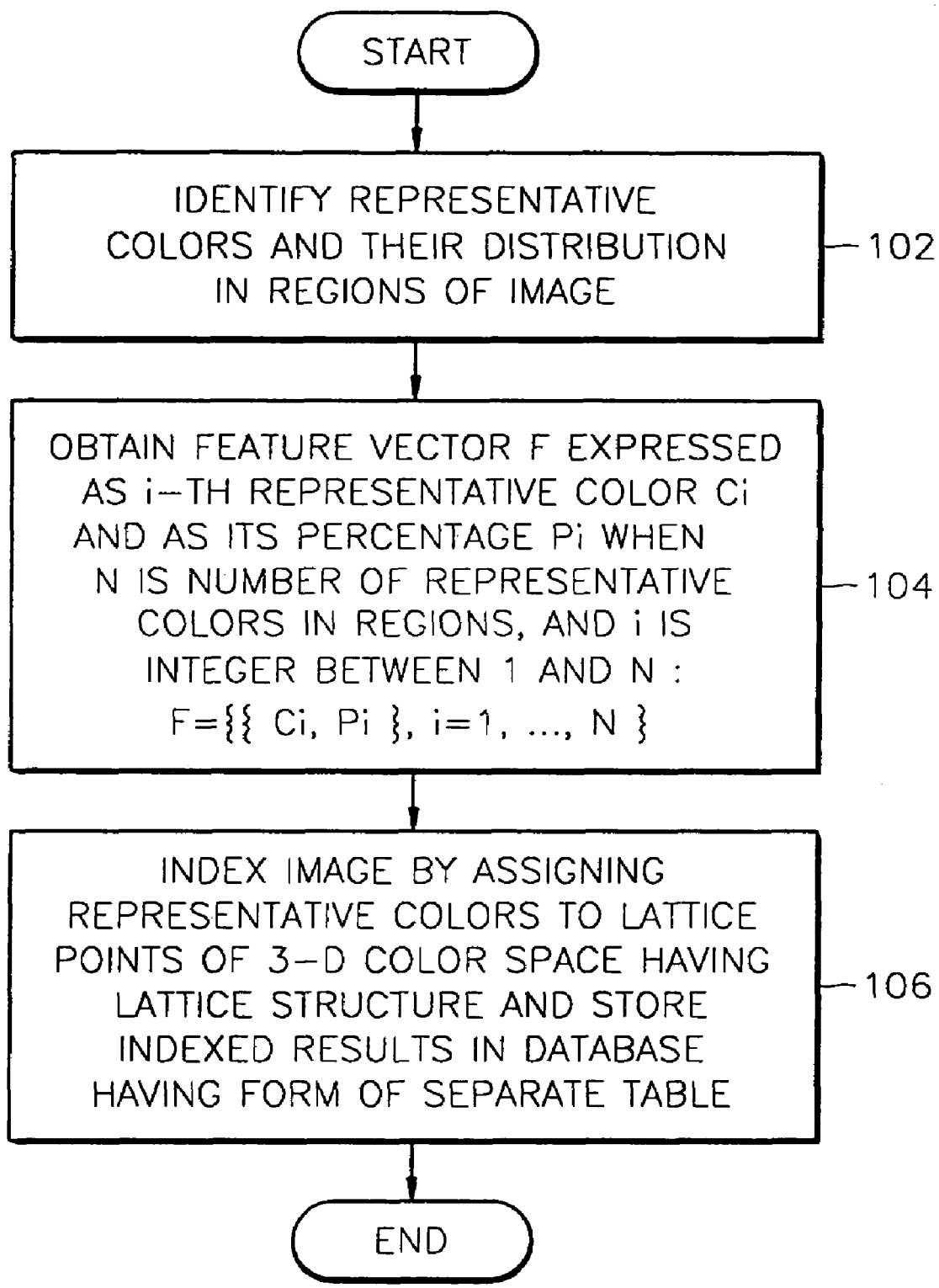
FIG. 1 is a flowchart illustrating a color image processing method according to a preferred embodiment of the present invention.

Referring to FIG. 1, which illustrates a flowchart of a color image processing method according to a preferred embodiment of the present invention, first, representative colors and their distribution are identified in the regions of an image (step 102). Here, a percentage can be used for the distribution, and the percentage can be understood as a value in which the number of corresponding pixels is divided by the number of the entire pixels by corresponding representative colors and multiplied by 100.

The identified representative colors and their percentages can be expressed as a feature vector. That is, when N is the number of representative colors in the regions, and i is an integer between 1 and N, the feature vector F expressed as an i-th representative color $c_i$ and as its percentage $p_i$ is obtained by the following equation (step 104):

$$F=\{\{c_i,p_i\},i=1,\ldots,N\}.$$

Figure 2:
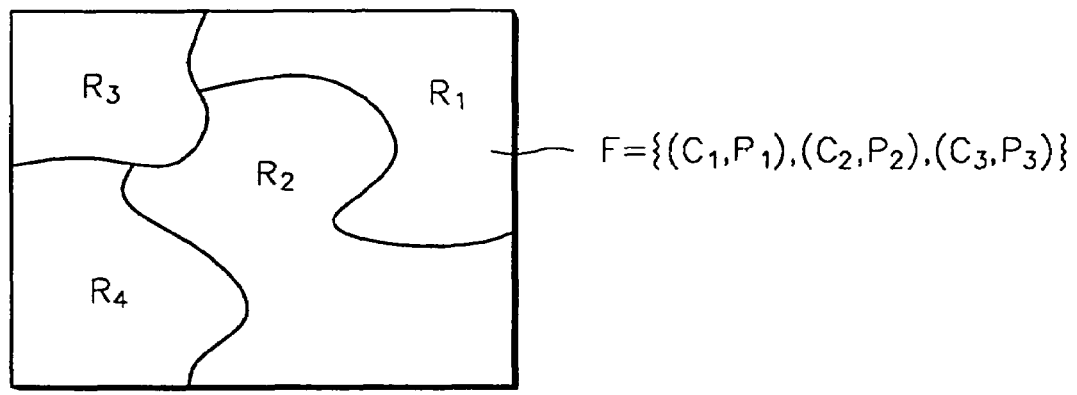
FIG. 2 illustrates one feature vector extracted from one region of an image.

Referring to FIG. 2, which illustrates one feature vector extracted from one region of an image, the feature vector F of a first region $R_1$ in an arbitrary image is expressed as a first representative color $c_1$ and its percentage $p_1$, a second representative color $c_2$ and its percentage $p_2$, and a third representative color $c_3$ and its percentage $p_3$. Likewise, the feature vector of other regions $R_2$, $R_3$, and $R_4$ can also be expressed.

Subsequently, the image is indexed by assigning the representative colors to lattice points of a 3-D color space having a lattice structure, and indexed results are stored in a database having the form of a separate table (step 106). The indexed results include a region identifier expressing the representative colors, their ratio, and serial numbers of an image and a region.

Figure 3:
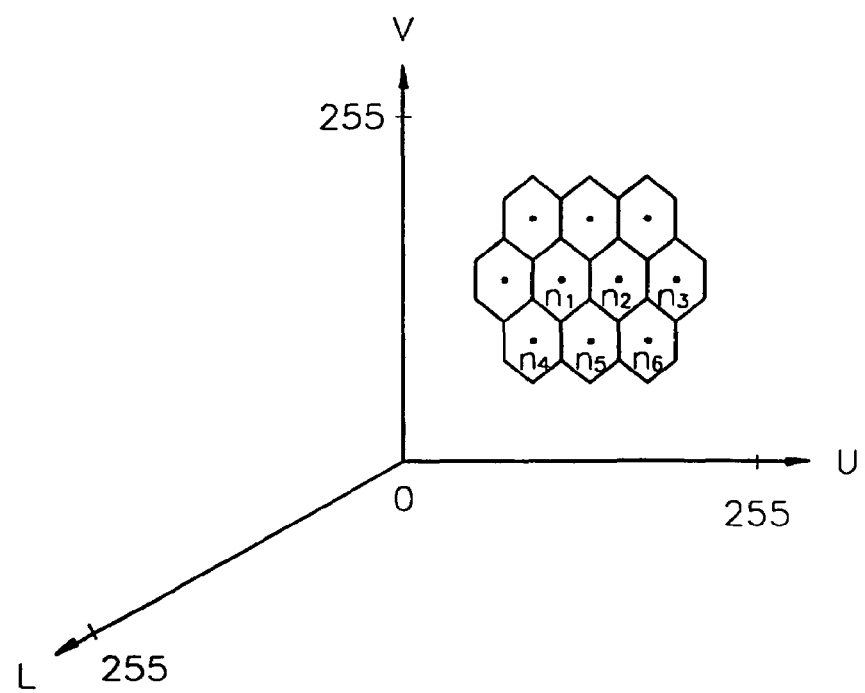
FIG. 3 illustrates a 3-D color space having a lattice structure.

Referring to FIG. 3, which illustrates a 3-D color space having a lattice structure, the 3-D color space composed of coordinate axes L, U, and V has a lattice structure. Each lattice has lattice points $n_1$, $n_2$, $n_3$, $n_4$, $n_5$, and $n_6$ in its center, and colors belonging to the range of this lattice are indexed into these lattice points.

Now, an assumption is made that the first representative color $c_1$ is included in the lattice having a first lattice point $n_1$, and the second representative color $c_2$ is included in the lattice having a $(k-1)^{th}$ lattice point $n_{k-1}$, and the third representative color $c_3$ is included in the lattice having a third lattice point $n_3$.

Each representative color and its percentages are stored in the database having the form newly-defined in a color image processing method according to the present invention. The database is classified into the storage places in which data corresponding to the lattice points $n_1$, $n_2$, $n_3$, . . . ,$n_{k-1}$, and $n_k$ are stored. This database is formed of a separate table, because the data expressing representative colors of each region and their percentages are separated and stored.

Figure 4:
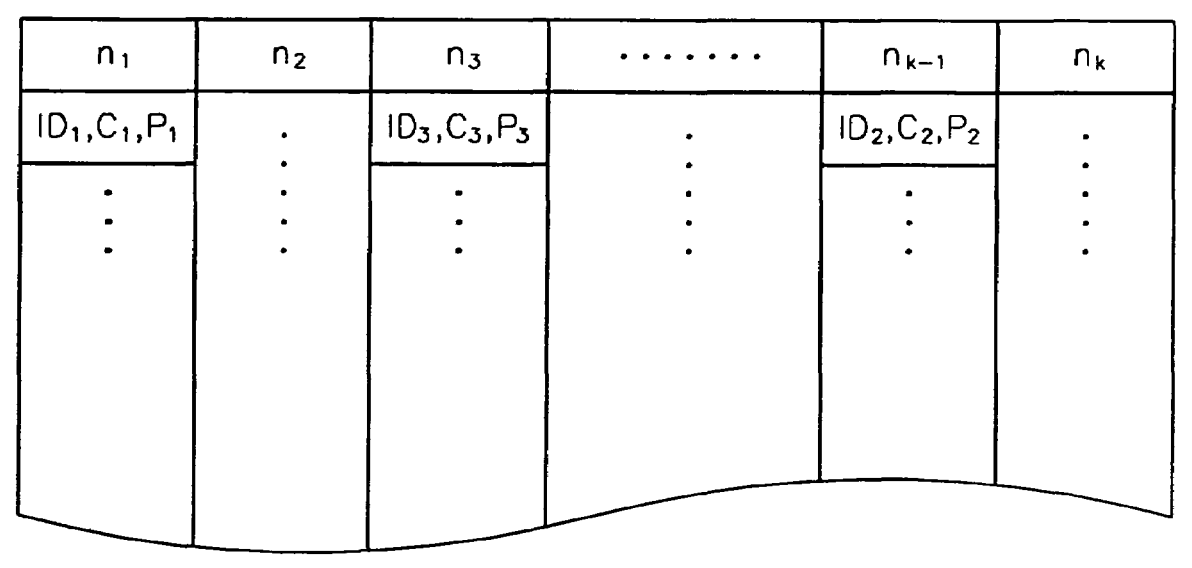

FIG. 4 illustrates a database having the form of a separate table used for the color image processing method of FIG. 1.

Now, the representative colors and their percentages are stored with a region identifier expressing each serial number of an image and a region in the places corresponding to lattice points to which the representative colors belong.

Then, the data expressing the first representative color $c_1$ and its percentage $p_1$ are stored in the places corresponding to the first lattice point $n_1$ together with the region identifier $ID_1$. Also, the data expressing the second representative color $c_2$ and its percentage $p_2$ are stored in the places corresponding to the $(k-1)^{th}$ lattice point $n_{k-1}$. Furthermore, the third representative color $c_3$ and its percentage $p_3$ are stored in the places corresponding to the third lattice point $n_3$. Here, region identifiers $ID_1$, $ID_2$, and $ID_3$ only express the same region of same image. In other words, referring to the database shown in FIG. 4, the first lattice point $n_1$ corresponds to data $ID_1$, $c_1$, and $p_1$, the third lattice point $n_3$ corresponds to data $ID_3$, $c_3$, and $p_3$, and the $(k-1)^{th}$ lattice point $n_{k-1}$ corresponds to data $ID_2$, $c_2$, and $p_2$.

According to the above color image processing method, an image is indexed by assigning the representative colors of the image to a color space divided into a plurality of regions. Accordingly, the database size for storing index information of an image is relatively small.

The color image indexed by the above color image processing method can efficiently search similar images to a query image, an image which a user wishes to search by the color image searching method according to the present invention.

Figure 5:
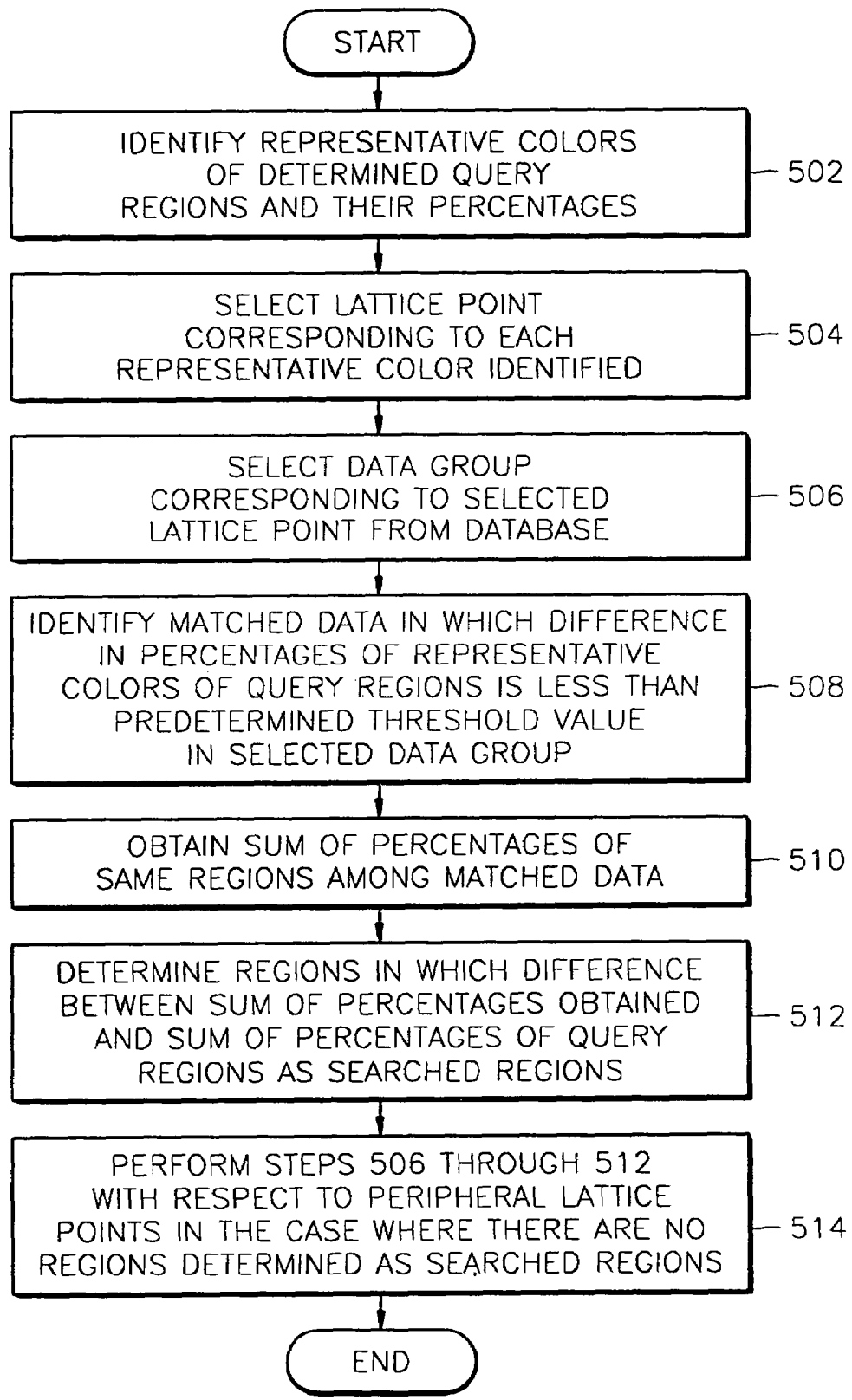
FIG. 5 is a flowchart illustrating a color image searching method according to the preferred embodiment of the present invention.

Referring to FIG. 5, which illustrates a flowchart of a color image searching method according to the preferred embodiment of the present invention, first, query regions of an original image which a user wishes to search in a database are determined.

Subsequently, representative colors of the determined query regions and their percentages are identified (step 502). The step 502 is similar to step 102 in the color image processing method shown in FIG. 1. Here, the percentages can be understood as values in which the number of corresponding pixels is divided by the number of the entire pixels by corresponding representative colors and multiplied by 100.

After that, a lattice point corresponding to each representative color identified is selected (step 504). As shown in FIG. 3, a number of the representative colors are included in one region having the form of a lattice, and a 3-D color space in which lattice points for distinguishing the region exist in the center of the region is assumed. That is, the identified representative colors have the regions to which the colors belong in the 3-D color space. Accordingly, the lattice points, center points of the regions, can be selected.

Also, in order to eliminate false matches, it is more preferable to consider the representative colors and their distribution, that is, their percentages together. Accordingly, a data group corresponding to the selected lattice point from the database is selected (step 506), and matched data in which the difference in the percentages of the representative colors of the query regions is less than a predetermined threshold value in the selected data group are identified (step 508). For example, assuming that 30% or so of one representative color of the representative colors in the query regions is included in the query regions, and the predetermined threshold value is 5%, data which correspond to the same lattice point as one representative color selected from the query regions and ±5% of 30%, the percentage of one representative color selected from the query regions, that is, 25% to 35% data are determined as the matched data.

After that, the sum of the percentages of same regions among the matched data is obtained (step 510). In other words, the data expressed as same regions by the region identifier among data determined as the matched data are sorted and the sum of the percentages with respect to the sorted data is obtained.

Subsequently, the regions in which the difference between the sum of the percentages obtained in the step 510 and the sum of the percentages of the query regions is less than a predetermined threshold value are determined as searched regions (step 512). As an alternative to this, it is possible to determine a small number of regions in which there is the least difference aligning according to the difference in the percentages as the searched regions or to determine only one region in which there is a minimum difference in the percentages as the searched region.

However, according to this method, for example, in the case where the representative colors of the query regions are located at an outer area in the lattice, there is a possibility that the regions having similar colors to the representative colors belong to another lattice, and then, the regions may be not searched. Accordingly, in the case where there are no regions determined as the searched regions, it is more preferable to perform steps 506 through 512 with respect to peripheral lattice points of the lattice point used for performing a search before (step 514).

According to the above-described color image searching method, due to the small size of a database the search speed can be fast, and the search can be efficiently made by not classifying images unnecessarily in detail. Further, the above color image searching method may be applied to object-based image processing, and a fast and efficient search and retrieval of multimedia contents can be made.

The above-described color image processing method and color image searching method can be used for a computer program. Codes and code segments constituting the program can be easily inferred by a skilled computer programmer in the art. Also, the program is stored in computer readable medium, read and executed by a computer, and it can thereby realize the color image processing method. The medium can include, among other things, magnetic media, optical media, and and any other machine readable form.

As described above, according to the present invention, the color image processing method may be applied to object-based image processing, and a fast search and retrieval of multimedia content can be made. However, the invention is not limited to the preferred embodiment and variations can be made thereto without departing from the spirit and the scope of the invention.

What is claimed is:

1. A color image processing method for indexing an image, comprising:
   (a) indexing a color image by assigning representative colors of an image to a color space divided into a plurality of regions, wherein the image is one region selected from divided regions;
   obtaining the representative colors of the image and their ratio; and
   storing a region identifier expressing the representative colors, their ratio, and serial numbers of an image and a region in a database as data.

2. The color image processing method according to claim 1, wherein the ratio is a percentage.

3. The color image processing method according to one of claims 1 and 2, wherein the color space is a three-dimensional color space.

4. The color image processing method according to claim 1, wherein the color space is a three-dimensional color space.

5. A color image processing method for indexing an image, comprising the steps of:
   (a-1) obtaining a feature vector F expressed as an i-th representative color $c_i$ and as its ratio $p_i$ where N is a number of representative colors in the divided regions of an image, and i is an integer between 1 and N: $F=\{\{c_i,p_i\},i=1,\ldots,N\}$;
   (a-2) indexing the image by assigning the representative colors to lattice points of a 3-D color space divided into a plurality of regions; and
   (a-3) storing indexed results in a database having the form of a separate table.

6. The color image processing method according to claim 5, wherein the ratio is a percentage.

7. The color image processing method according to claim 5 or claim 6, wherein the indexed results include a region identifier expressing the representative colors, their ratio, and serial numbers of an image and a region.

8. The color image processing method according to claim 5 or claim 6, wherein the image is one region selected from divided regions.

9. The color image processing method according to claim 7, wherein the image is one region selected from divided regions.

10. The color image processing method according to claim 5 or claim 6, wherein the color space is a three-dimensional color space.

11. The color image processing method according to claim 7, wherein the color space is a three-dimensional color space.

12. The color image processing method according to claim 8, wherein the color space is a three-dimensional color space.

13. The color image processing method according to claim 9, wherein the color space is a three-dimensional color space.

14. A computer readable medium for storing a program performing a color image processing method for indexing an image, said medium including computer readable program code means for:

(a-1) obtaining a feature vector F expressed as an i-th representative color $c_i$ and as its percentage $p_i$ when N is a number of representative colors in the divided regions of an image, and i is an integer between 1 and N:

$F=\{\{c_i,p_i\},i=1,\ldots,N\}$;

(a-2) indexing the image by assigning the representative colors to lattice points of a 3-D color space divided into a plurality of regions; and (a-3) storing indexed results in a database having the form of a separate table.

15. The computer readable medium according to claim 14, wherein the indexed results include a region identifier expressing the representative colors, their ratio, and serial numbers of an image and a region.

* * * * *